(12) United States Patent
Ergan et al.

(10) Patent No.: US 8,548,263 B2
(45) Date of Patent: Oct. 1, 2013

(54) DELAYED IMAGE DECODING

(75) Inventors: Cenk Ergan, Bellevue, WA (US); Rafael V. Cintron, Kirkland, WA (US); Samuel R. Fortiner, Woodinville, WA (US); Prabhakar Marnadi, Redmond, WA (US); Sandra G. Roberts, Bothell, WA (US); Kedar Sanjeev Hirve, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 13/009,332

(22) Filed: Jan. 19, 2011

(65) Prior Publication Data

US 2012/0183233 A1    Jul. 19, 2012

(51) Int. Cl.
*H04N 7/50* (2006.01)

(52) U.S. Cl.
USPC ............................ 382/233; 382/232; 382/248

(58) Field of Classification Search
USPC ... 382/232, 233, 248; 345/426; 375/E7.083, 375/E7.04; 713/1, 100; 709/219, 225; 715/706; 705/14.4, 14.73
See application file for complete search history.

(56) References Cited

U.S. PATENT DOCUMENTS

| | | | |
|---|---|---|---|
| 6,233,358 B1 * | 5/2001 | Acharya | 382/248 |
| 6,408,387 B1 * | 6/2002 | Wells | 713/1 |
| 6,430,591 B1 | 8/2002 | Goddard | |
| 6,487,588 B1 | 11/2002 | Phillips et al. | |
| 6,593,925 B1 * | 7/2003 | Hakura et al. | 345/426 |
| 6,879,725 B2 | 4/2005 | Rijavec et al. | |
| 7,162,080 B2 | 1/2007 | Chui et al. | |
| 2003/0079226 A1 | 4/2003 | Barrett | |
| 2010/0125649 A1 | 5/2010 | Day et al. | |
| 2010/0272174 A1 | 10/2010 | Toma et al. | |

FOREIGN PATENT DOCUMENTS

| | | |
|---|---|---|
| EP | 1569453 A2 | 8/2005 |
| WO | 0225945 A1 | 3/2002 |

OTHER PUBLICATIONS

"International Search Report", Mailed Date: Jul. 30, 2012, Application No. PCT/US2012/021003, Filed Date:Jan. 12, 2012, pp. 9.
"Implementing an Image Decoder Object", Retrieved at << http://msdn.microsoft.com/en-us/library/aa919805.aspx >>, Retrieved Date: Dec. 22, 2010, pp. 2.
"Progressive Decoding Overview", Retrieved at << http://msdn.microsoft.com/en-us/library/ee720036(v=vs.85).aspx >>, Retrieved Date: Dec. 22, 2010, pp. 4.
Barth, et al., "The Security Architecture of the Chromium Browser", Retrieved at << http://seclab.stanford.edu/websec/chromium/chromium-security-architecture.pdf >>, Technical Report, 2008, pp. 1-10.

* cited by examiner

*Primary Examiner* — Anh Do
(74) *Attorney, Agent, or Firm* — Wolfe-SBMC

(57) ABSTRACT

In one or more embodiments, a framework is provided in which image decoding can be delayed based on heuristics, and later initiated based on a use type associated with the image or the likelihood that the image is going to be used. For example, a use history and priority system can enable images that are currently being rendered and/or are likely to get rendered to be decoded before images that have a history of being downloaded but never used. Accordingly, by decoupling image download from image decoding, CPU resources and memory can be more efficiently utilized.

28 Claims, 4 Drawing Sheets

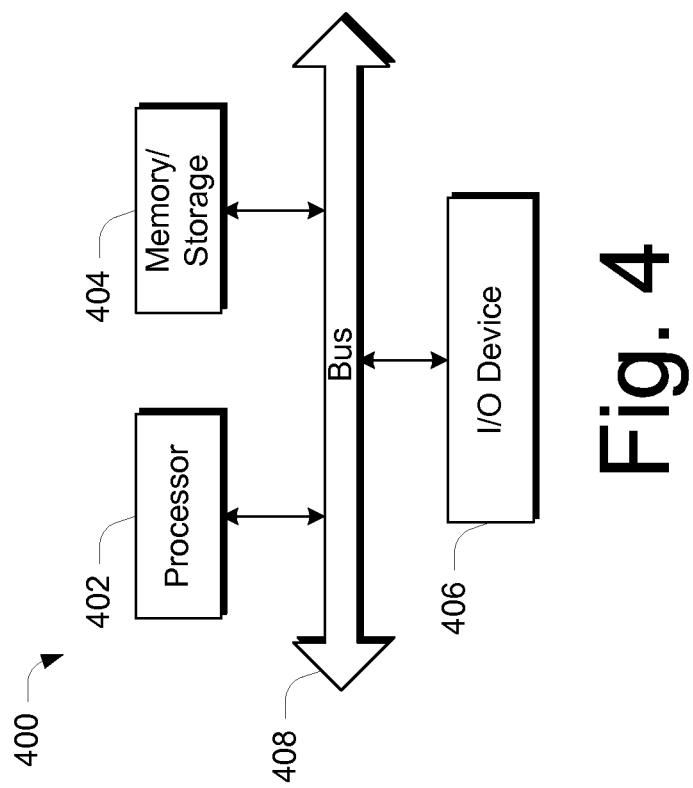

DELAYED IMAGE DECODING

BACKGROUND

Typically, when a web browser requests a webpage that includes an image, when the image is downloaded it is also decoded at the time of download. Decoding an image involves expanding or decompressing the image into a form in which it can be rendered using a computer system's video hardware. Decompressing images consumes CPU resources and overhead. In addition, decompressing images can also consume memory resources.

Yet, in some situations, a referenced image may not end up being rendered and viewed. In these instances, decoding the image wastes CPU resources, overhead and memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a framework is provided in which image decoding can be delayed based on heuristics, and later initiated based on a use type associated with the image or the likelihood that the image is going to be used. For example, a use history and priority system can enable images that are currently being rendered and/or are likely to get rendered to be decoded before images that have a history of being downloaded but never used. Accordingly, by decoupling image download from image decoding, CPU resources and memory can be more efficiently utilized.

BRIEF DESCRIPTION OF THE DRAWINGS

The same numbers are used throughout the drawings to reference like features.

FIG. 4 illustrates an example system that can be utilized to implement one or more embodiments.

DETAILED DESCRIPTION

Overview

In one or more embodiments, a framework is provided in which image decoding can be delayed based on heuristics, and later initiated based on a use type associated with the image or the likelihood that the image is going to be used. For example, a use history and priority system can enable images that are currently being rendered and/or are likely to get rendered to be decoded before images that have a history of being downloaded but never used. Accordingly, by decoupling image download from image decoding, CPU resources and memory can be more efficiently utilized.

In the discussion that follows, a section entitled "Operating Environment" is provided and describes one environment in which one or more embodiments can be employed. Following this, a section entitled "Image Decoder Module Operation" describes operation of an image decoder module in accordance with one or more embodiments. Last, a section entitled "Example System" describes an example system that can be utilized in accordance with one or more embodiments.

Consider now an example operating environment in which one or more embodiments can be implemented.

Operating Environment

Figure 1:
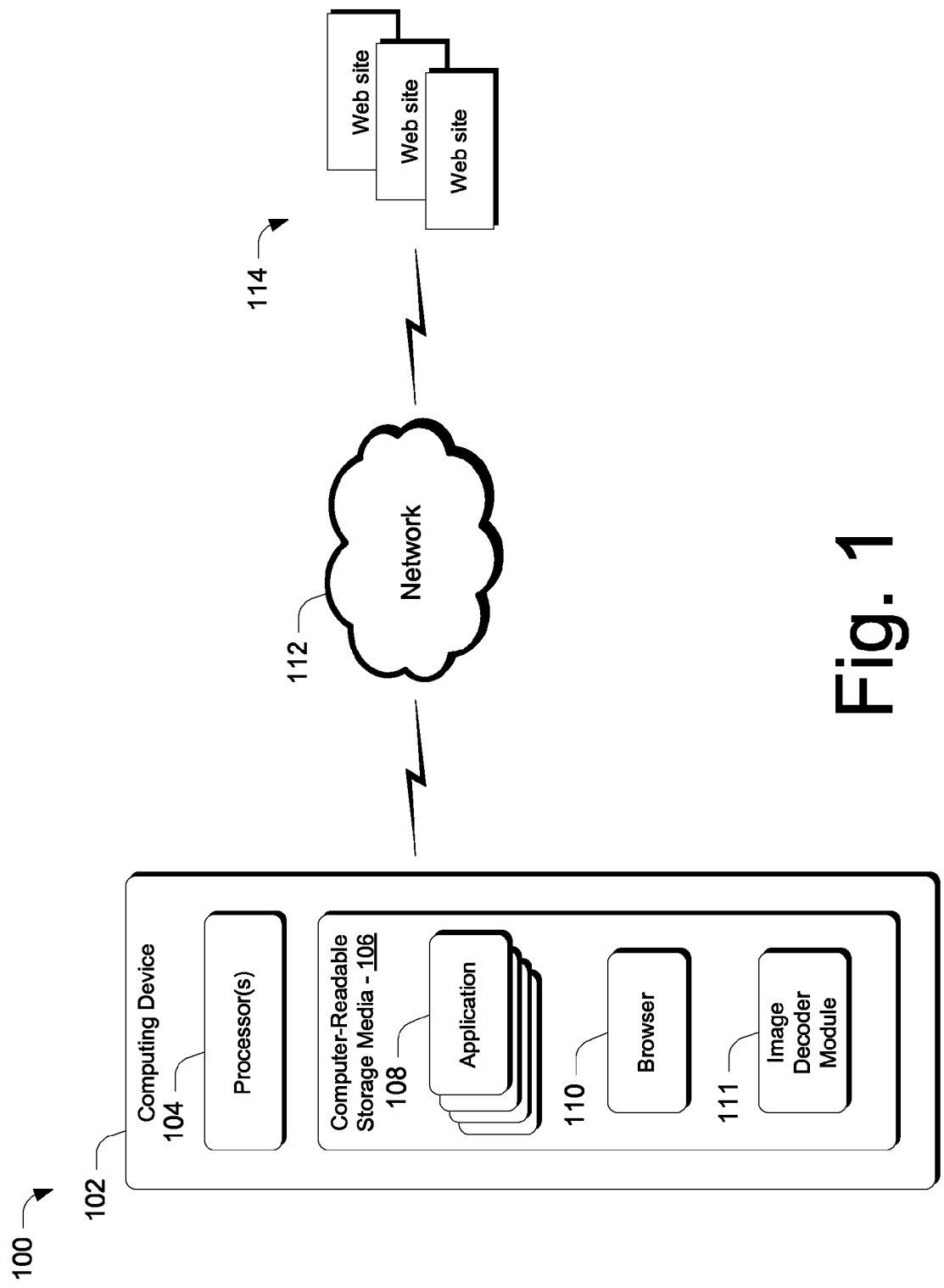
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 4.

In addition, computing device 102 includes a software application in the form of a web browser 110. Any suitable web browser can be used, examples of which are available from the assignee of this document and others. In addition, computer-readable storage media 106 can include an image decoder module 111 that operates as described above and below. The image decoder module can be integrated in web browser 110 or it can be a standalone component that is utilized by the web browser.

In operation, image decoder module 111 forms part of a framework in which image download is decoupled from image decoding. The image decoder module is configured to intelligently ascertain when downloaded images may be efficiently decoded for rendering. In at least some embodiments, image decoding can be delayed by the image decoder module 111 based on heuristics, and later initiated based on a use type associated with the image or the likelihood that the image is going to be used. For example, the image decoder module can utilize a use history and priority system to enable images that are currently being rendered and/or are likely to get rendered to be decoded before images that have a history of being downloaded but never used. Accordingly, by decoupling image download from image decoding, CPU resources and memory can be more efficiently utilized.

In addition, environment 100 includes a network 112, such as the Internet, and one or more web sites 114 from and to which content can be received and sent. Such content can include web pages that contain images that are to be processed by image decoder module 111.

Computing device 102 can be embodied as any suitable computing device such as, by way of example and not limitation, a desktop computer, a portable computer, netbook, a handheld computer such as a personal digital assistant (PDA), cell phone, and the like.

Having described an example operating environment, consider now a discussion of the operation of an example image decoder module in accordance with one or more embodiments.

Image Decoder Module Operation

Figure 2:
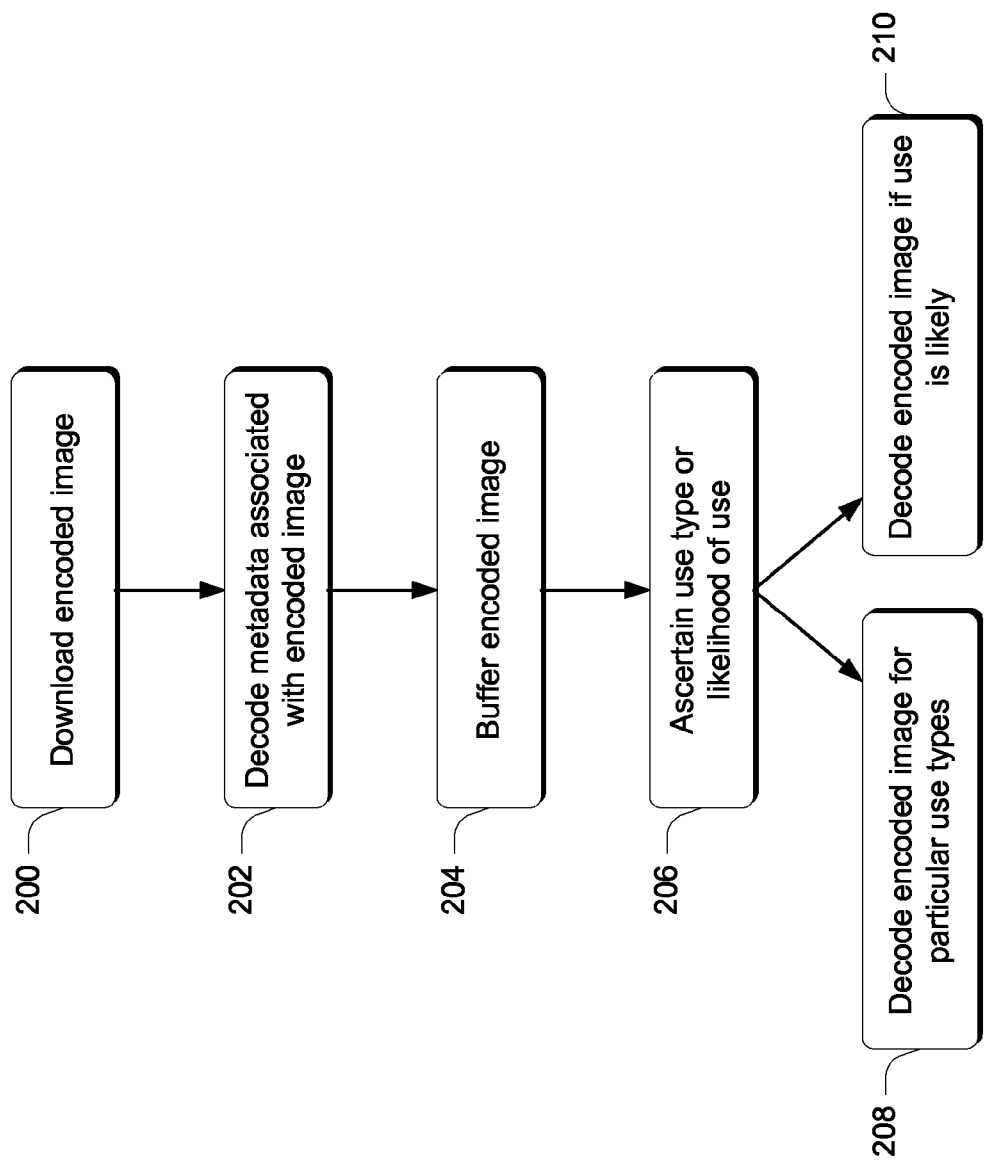
FIG. 2 is a flow diagram that describes steps in a method in accordance with one or more embodiments.

FIG. 2 illustrates certain aspects of the operation of image decoder module 111 (FIG. 1) in accordance with one or more embodiments.

Step 200 downloads one or more encoded images. This step can be performed in any suitable way. For example, in at least some embodiments, images can be downloaded by a suitably-configured web browser responsive to browser navigation. Step 202 decodes metadata associated with the downloaded image or images. By decoding the metadata associated with the downloaded image or images and not the images themselves, useful information associated with the image or images, such as size information, transparency, and the like can be ascertained in advance of image decoding. For example, the size information ascertained from the metadata can be utilized to pre-process page layout in advance of image decoding. Furthermore, the size information can be utilized to ascertain whether to delay the decoding of a particular image. For example, images that are below a certain size threshold (e.g., 256 kB) can be decoded as soon as they are downloaded. Similarly, images that are above a certain size threshold can be decoded at a later time to be determined.

Step 204 buffers the encoded image in the event image decoding for that particular image is to be delayed. Images that are buffered can be assigned priorities such as "low," "normal," "high" and the like. The priorities can be changed in accordance with processing described just below.

Step 206 ascertains a use type associated with the image or images, or the likelihood of use of a particular image or images.

Step 208 decodes the encoded image or images on demand either synchronously or asynchronously, for particular use types, while other computation may occur. This step can be performed by raising the priority of the image or images such that a suitably configured web browser will advance the image or images in the decoding queue. Examples of particular use types are described below in the section entitled "Example Use Types."

Alternately or additionally, step 210 decodes the encoded image or images on demand either synchronously or asynchronously if its use is likely. Likewise, this step can be performed by raising the priority of the image or images such that a suitably configured web browser will advance the image or images in the decoding queue. Examples of how this can be done are provided below in the section entitled "Likelihood of Use."

Consider now some example user types in accordance with one or more embodiments. It is to be appreciated and understood that the described use types constitute but examples only and are not intended to limit application of the claimed subject matter to these specific use types. As such, other use types can be employed without departing from the spirit and scope of the claimed subject matter.

Example Use Types

In one or more embodiments, certain use types associated with an image or images will determine whether the image can be decoded in a delayed fashion, as by being assigned a lower priority, or whether decoding of the image is to be performed on demand, as by being assigned a high priority.

One type of use in which decoding can be performed on demand, to enhance the user experience, is associated with a so-called initialization operation. Specifically, if an image is to appear in an initial view, decoding of the image can be performed on demand and/or the image can be progressively rendered. Assume, for example, that a user has navigated to a page for the very first time and that images associated with the page have not yet been decoded. In this instance, images that are to appear in the first view are detected and page rendering is postponed until the images have been decoded. In one or more embodiment, a delay threshold can be defined, e.g. 100 ms, and utilized control how long page rendering is postponed. Any suitable type of delay threshold can be utilized.

Another type of use in which decoding can be performed on demand is associated with user interactions. Specifically, in some scenarios, a user experience can be enhanced through interactive feedback. For example, if a user hovers their cursor over a particular object appearing on a webpage, a thumbnail image may be exposed to provide the user with additional information associated with the object over which the cursor is hovered. For example, some desktop user interfaces include a task bar at the bottom of the user interface. In some instances, objects appearing in the task bar can have associated thumbnail images which can be accessed by an "on hover" operation in which a cursor is hovered over the task bar object. In these and other instances, images associated with the thumbnail image can be decoded in advance so that the thumbnail images can be rendered accurately and in a timely manner.

Another type of use in which decoding can be performed on demand is associated with operations that may need access to a decoded image, even though the image is not currently being displayed. One such operation is a printing operation. Specifically, when a webpage is printed, instructions are generated and sent to a printer to enable the printer to print the webpage. Assume, for example, the user has navigated to a 100-page document and that various images throughout the document have been designated for delayed decoding. If the user now invokes a print operation from page 3 and various images appearing on unviewed page 91 are not decoded, then the printed document will not include those latter images. In these types of situations, as well as others, the images that have been designated for delayed decoding can be decoded on demand before the document is sent to the printer. This can ensure that the images appearing in the document are accurately printed.

Another type of use in which decoding can be performed on demand is associated with so-called filter operations. Specifically, some Web browsers enable a portion of a webpage to be selected or clipped, and for a visual effect to be applied to the selected portion. For example, part of a webpage can be selected and rotated, or can have a transparency filter applied to it. If the selected portion of the webpage includes images that have not been decoded, then the filter operation will either be incomplete or might, in some instances, fail. In these situations, if part of web page is selected for a filter operation and includes images that have not been decoded, those images can be decoded on demand synchronously, before the filter operation is applied.

Another type of use in which decoding can be performed on demand is associated with the <canvas> element which is part of HTML 5. As will be appreciated, the <canvas> element can be used to draw graphics using scripting, such as JavaScript. It can be used, for example, to draw graphs, make photo compositions or to do simple and complex animations. In one or more embodiments, images that are used in connection with the <canvas> element can be decoded on demand synchronously before use.

Having described some example use types in which decoding can be performed on demand, consider now some "likelihood of use" scenarios in accordance with one or more embodiments.

Likelihood of Use

In one or more embodiments, the image decoder module 111 (FIG. 1) can ascertain whether use of a particular image that has been designated for delayed decoding has a likelihood of being used. If so, the image can be decoded on demand. This helps to mitigate a situation in which, for example, an image is actually needed for rendering but not yet decoded. Determining likelihood of use can be performed in any suitable way, examples of which are provided below.

In one or more embodiments, likelihood of image use can be ascertained by considering the positional proximity or logical proximity of an image relative to a current view.

Figure 3:
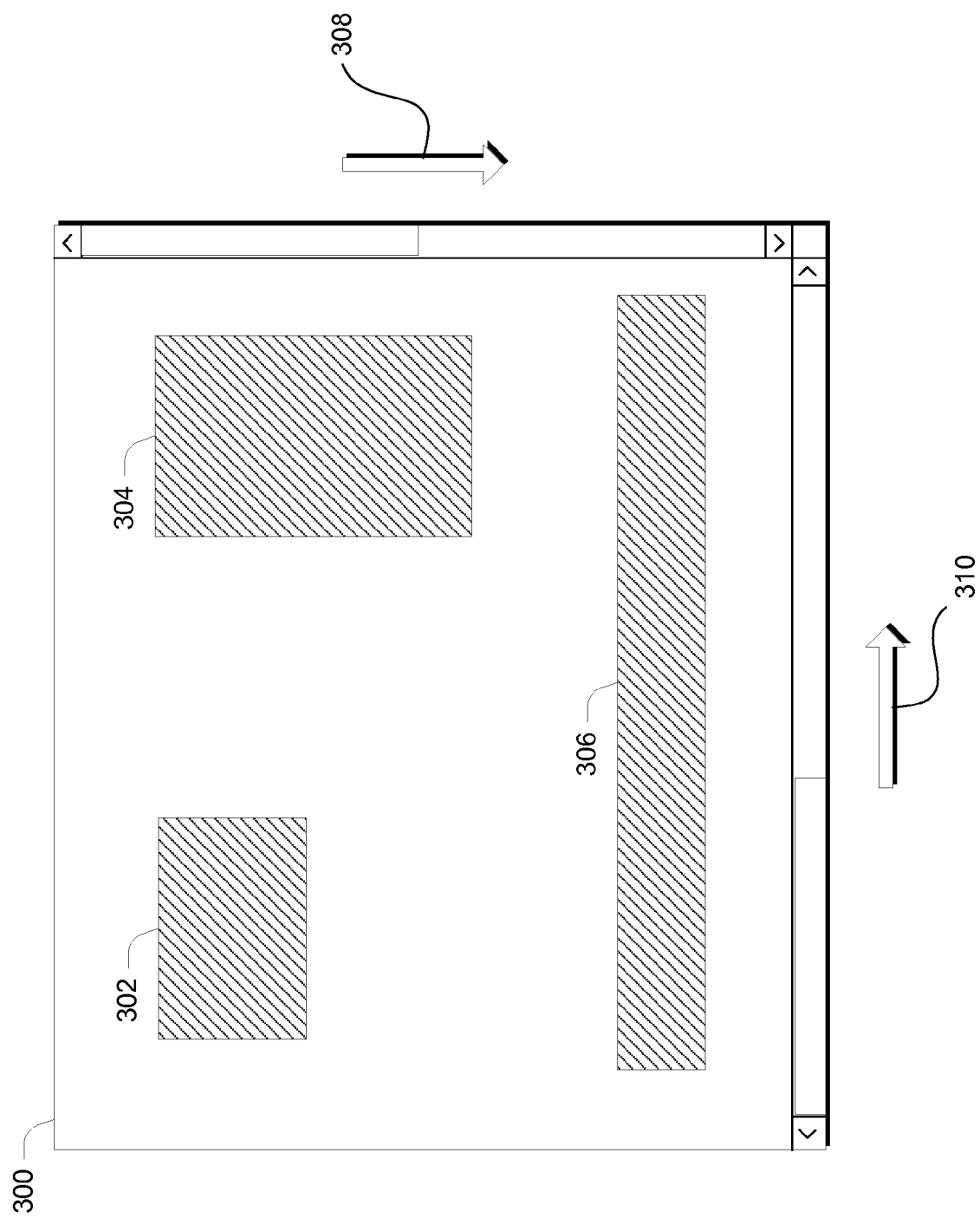
FIG. 3 illustrates an example viewport in accordance with one or more embodiments.

As an example, consider FIG. 3. There, a viewport associated with a web browser is diagrammatically represented at 300. Within the viewport three images appear—images 302, 304, and 306. Notice also that further content associated with the webpage upon which images 302, 304, and 306 appear can be accessed by paging or scrolling down in the direction of arrow 308, or by sideways scrolling in the direction of arrow 310. In one or more embodiments, if unseen images are located within positional proximity of rendered images, and can be accessed by paging or scrolling down, or by conducting a sideways scrolling operation, these unseen images can be decoded on demand in the background. Positional proximity can be ascertained in any suitable way. For example, in some embodiments an unseen image can be considered within positional proximity of a displayed image if the unseen image appears within one or more page up or page down operations.

Logical proximity can be ascertained by determining whether an unseen image shares a relationship with a displayed image such that it may likely be accessed in connection with the displayed image. For example, an unseen image that comprises a slide show associated with a displayed image may likely be accessed by the user viewing the slide show. Alternately or additionally, images may be linked in some manner such that an unseen image is accessible through or by otherwise using a displayed image. Alternately or additionally, logical proximity can be ascertained by ascertaining which images, if any, can be accessed for view by a user depressing an "end" key or by implementing a similar "end of document" operation.

Decoding these images on demand either synchronously or asynchronously while other computation may occur, in these and other situations, helps to mitigate a situation, for example, in which a user might page down to a portion of a webpage in which an image resides but which has not yet been decoded.

In one or more embodiments, likelihood of image use can be ascertained by maintaining a history associated with individual images that describes the frequency of use of a particular image. Thus, those images that get used or rendered more often can be decoded on demand, and those images that do not get used or rendered as often can be designated for delayed decoding. For example, if one image has a history that indicates that the image was downloaded 10 times and rendered nine of those times, and another image has a history that indicates that the image was downloaded 10 times and rendered three of those times, a higher priority can be assigned to the first image and, if appropriate, the first image can be decoded on demand either synchronously or asynchronously.

In one or more embodiments, likelihood of image use can be ascertained by a type of operation that is to be performed relative to an image. For example, if the image is part of a render or access operation, then the image can be decoded on demand. This can include boosting a particular image's decoding priority so that it is decoded immediately.

Alternately or additionally, in one or more embodiments, based on determined priority and/or use-likelihood, images that support it may be decoded to a progressive level and a smaller size that is not as expensive as full image decoding. Additionally, if available, GPU mipmap support may be used to render images using the sizes available/decoded at rendering time.

Having described the operation of an example image decoder module, consider now an example system that can be utilized to implement the embodiments described above.

Example System

FIG. 4 illustrates an example computing device 400 that can be used to implement the various embodiments described above. Computing device 400 can be, for example, computing device 102 of FIG. 1 or any other suitable computing device.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

As described above, a framework is provided in which image decoding can be delayed based on heuristics, and later initiated based on a use type associated with the image or the likelihood that the image is going to be used. For example, a use history and priority system can enable images that are currently being rendered and/or are likely to get rendered to be decoded before images that have a history of being downloaded but never used. Accordingly, by decoupling image download from image decoding, CPU resources and memory can be more efficiently utilized.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
   downloading, on a client device, one or more encoded images associated with a webpage;
   buffering, on the client device, the one or more encoded images;
   ascertaining a use type associated with the one or more encoded images; and
   decoding one or more encoded images on demand for particular use types.

2. The computer-implemented method of claim 1 further comprising after said downloading, decoding metadata associated with the one or more encoded images, the metadata including at least size information associated with the one or more encoded images.

3. The computer-implemented method of claim 1, wherein one particular use type is associated with an initialization operation.

4. The computer-implemented method of claim 1, wherein one particular use type is associated with use of thumbnail images.

5. The computer-implemented method of claim 1, wherein one particular use type is associated with operations that may need access to a decoded image, even though an associated encoded image is not currently being displayed.

6. The computer-implemented method of claim 1, wherein one particular use type is associated with operations that may need access to a decoded image, even though an associated encoded image is not currently being displayed, wherein said one particular use type comprises a printing operation.

7. The computer-implemented method of claim 1, wherein one particular use type is associated with a filter operation.

8. The computer-implemented method of claim 1, wherein one particular use type is associated with a <canvas> element.

9. The computer-implemented method of claim 1, wherein said decoding one or more encoded images on demand comprises decoding said one or more images synchronously for particular use types.

10. The computer-implemented method of claim 1, wherein said decoding one or more encoded images on demand comprises decoding said one or more images asynchronously for particular use types.

11. A computer-implemented method comprising:
    downloading, on a client device, one or more encoded images associated with a webpage;
    buffering, on the client device, the one or more encoded images;
    ascertaining likelihood of use of the one or more encoded images; and
    decoding one or more encoded images on demand if use for the one or more encoded images is likely.

12. The method of claim 11, wherein ascertaining a likelihood of use comprises considering whether at least one unseen image is located within positional proximity of rendered images in a current view and if so, said decoding comprises decoding said at least one unseen image.

13. The method of claim 11, wherein ascertaining a likelihood of use comprises considering whether at least one unseen image is located within positional proximity of rendered images in a current view by a manipulation operation of the webpage.

14. The method of claim 11, wherein ascertaining a likelihood of use comprises determining whether an unseen encoded image shares a relationship with a displayed image such that it may likely be accessed in connection with the displayed image.

15. The method of claim 11, wherein ascertaining a likelihood of use comprises maintaining a history associated with individual images, the history describing frequency of use of the individual images.

16. The method of claim 11, wherein ascertaining a likelihood of use comprises ascertaining a type of operation that is to be performed relative to an image.

17. The computer-implemented method of claim 11, wherein said decoding one or more encoded images on demand comprises decoding said one or more encoded images synchronously if use for the one or more encoded images is likely.

18. The computer-implemented method of claim 11, wherein said decoding one or more encoded images on demand comprises decoding said one or more encoded images asynchronously if use for the one or more encoded images is likely.

19. The method of claim 13, wherein the manipulation operation comprises a paging operation.

20. The method of claim 13, wherein the manipulation operation comprises a scrolling operation.

21. One or more computer-readable storage media embodying computer-readable instructions which, when executed, implement a method comprising:
    downloading, on a client device, one or more encoded images associated with a webpage;
    buffering, on the client device, the one or more encoded images;
    ascertaining a use type associated with at least one of the one or more encoded images;
    ascertaining likelihood of use of at least one other of the one or more encoded images;
    decoding said at least one of the one or more encoded images on demand for particular use types; and
    decoding said at least one other of the one or more encoded images on demand if use for the at least one other of the one or more encoded images is likely.

22. The one or more computer-readable storage media of claim 21, wherein one particular use type is associated with an initialization operation.

23. The one or more computer-readable storage media of claim 21, wherein one particular use type is associated with operations that may need access to a decoded image, even though the associated encoded image is not currently being displayed.

24. The one or more computer-readable storage media of claim 21, wherein ascertaining a likelihood of use comprises considering whether at least one unseen image is located within positional proximity of rendered images in a current view and if so, decoding said at least one unseen image.

25. The one or more computer-readable storage media of claim 21, wherein ascertaining a likelihood of use comprises maintaining a history associated with individual images, the history describing frequency of use of the individual images.

26. The one or more computer-readable storage media of claim 21, wherein the computer-readable instructions are embodied as a web browser.

27. The one or more computer readable storage media of claim 21, wherein said decoding said at least one other of the one or more encoded images on demand comprises doing so synchronously if use for the at least one other of the one or more encoded images is likely.

28. The one or more computer readable storage media of claim 21, wherein said decoding said at least one other of the one or more encoded images on demand comprises doing so asynchronously if use for the at least one other of the one or more encoded images is likely.

* * * * *